US011990068B2

(12) United States Patent
Lee et al.

(10) Patent No.: US 11,990,068 B2
(45) Date of Patent: May 21, 2024

(54) DISPLAY DEVICE

(71) Applicant: Samsung Display Co., Ltd., Yongin-si (KR)

(72) Inventors: Dae-Sik Lee, Hwaseong-si (KR); Keunoh Kang, Uijeongbu-si (KR); Sanghyun Lee, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/082,071

(22) Filed: Dec. 15, 2022

(65) Prior Publication Data

US 2023/0282142 A1 Sep. 7, 2023

(30) Foreign Application Priority Data

Mar. 3, 2022 (KR) ........................ 10-2022-0027658

(51) Int. Cl.
*G09G 3/00* (2006.01)
*G09G 3/3208* (2016.01)

(52) U.S. Cl.
CPC ........... *G09G 3/006* (2013.01); *G09G 3/3208* (2013.01); *G09G 2330/02* (2013.01); *G09G 2330/04* (2013.01); *G09G 2330/12* (2013.01)

(58) Field of Classification Search
CPC .. G09G 3/006; G09G 3/3208; G09G 2330/02; G09G 2330/04; G09G 2330/12; G09G 3/3233; G09G 3/3216
See application file for complete search history.

(56) References Cited

U.S. PATENT DOCUMENTS

| | | | | |
|---|---|---|---|---|
| 8,664,964 | B2 | 3/2014 | Chen et al. | |
| 8,823,276 | B2 | 9/2014 | Cho et al. | |
| 9,597,225 | B1 * | 3/2017 | Guerrieri | A61F 7/007 |
| 10,204,023 | B2 | 2/2019 | Kang | |
| 11,243,297 | B2 * | 2/2022 | Gilliland | G01R 27/205 |
| 2010/0295567 | A1 * | 11/2010 | Chang | G01R 31/70 324/719 |
| 2012/0105085 | A1 * | 5/2012 | Chen | G09G 3/006 324/693 |
| 2013/0038232 | A1 * | 2/2013 | Cho | G09G 3/3406 315/224 |
| 2014/0062936 | A1 * | 3/2014 | Al-Dahle | G09G 3/36 345/87 |

(Continued)

FOREIGN PATENT DOCUMENTS

| | | | |
|---|---|---|---|
| KR | 1020130017278 | A | 2/2013 |
| KR | 1020170033966 | A | 3/2017 |

*Primary Examiner* — Jose R Soto Lopez
(74) *Attorney, Agent, or Firm* — CANTOR COLBURN LLP

(57) ABSTRACT

A display device includes: a display panel including a plurality of pixels, which displays an image; a first circuit board connected to the display panel and which provides a first signal to the display panel; a second circuit board, which provides a second signal to the first circuit board, and a connection board, which electrically connects the first circuit board to the second circuit board and includes a connection portion connected to the first circuit board and the second circuit board. The second circuit board includes a connection detection circuit, which detects a connection status of the connection portion and generates a detection signal.

19 Claims, 9 Drawing Sheets

(56) References Cited

U.S. PATENT DOCUMENTS

2014/0062940 A1* 3/2014 Al-Dahle .............. G06F 3/0412 345/87
2014/0085290 A1* 3/2014 Yu ........................ G09G 3/3208 345/212
2014/0117998 A1* 5/2014 Hwang .................. G09G 3/006 324/511
2014/0125645 A1* 5/2014 Ghaderi ................. G09G 3/006 345/87
2014/0159764 A1* 6/2014 Al-Dahle ........... G01R 31/2853 324/762.01
2014/0187088 A1* 7/2014 Kim ...................... G02F 1/1309 439/620.01
2014/0354618 A1* 12/2014 Shin ..................... G09G 3/3225 345/212
2015/0029096 A1* 1/2015 Ishihara ........... H04N 21/42201 345/156
2015/0061723 A1* 3/2015 Zhang ..................... H01L 22/34 257/737
2015/0138172 A1* 5/2015 Kim ......................... G09G 3/20 345/82
2015/0160276 A1* 6/2015 Moon .................... G09G 3/006 702/65
2015/0268274 A1* 9/2015 Song .................. G01R 1/06794 324/754.1
2016/0140888 A1* 5/2016 Lee ....................... G06F 1/1626 345/698
2016/0189581 A1* 6/2016 Hwang .................. G09G 3/006 345/691
2016/0203777 A1* 7/2016 Brahma ............... G01R 27/205 345/87
2016/0321984 A1* 11/2016 Kim ..................... G09G 3/2096
2017/0083133 A1* 3/2017 Kang .................. G06F 11/2221
2017/0243797 A1* 8/2017 Kim ........................ H01L 22/34
2017/0345375 A1* 11/2017 Cho ..................... G09G 3/3275
2018/0061294 A1* 3/2018 Kim ........................ G09G 3/367
2018/0233436 A1* 8/2018 Lee ..................... H01L 23/4824
2019/0066603 A1* 2/2019 Lee ...................... G09G 3/3233
2019/0212850 A1* 7/2019 Kim ...................... G06F 1/1626
2019/0259328 A1* 8/2019 You ...................... G09G 3/3677
2020/0006216 A1* 1/2020 Kim ......................... H05K 1/14
2020/0027380 A1* 1/2020 Lee ...................... H10K 59/131
2020/0200883 A1* 6/2020 Gilliland ................ G01R 31/66
2020/0265787 A1* 8/2020 Im ........................ G09G 3/3291
2020/0320951 A1* 10/2020 Shin .................... G02F 1/13452
2020/0348573 A1* 11/2020 Shin ......................... G09G 3/20
2021/0035521 A1* 2/2021 Qiu ...................... G09G 3/3275
2021/0056282 A1* 2/2021 Kim ......................... G09G 3/32
2021/0056908 A1* 2/2021 Park ..................... G09G 3/3275
2021/0150951 A1* 5/2021 Liu ........................ G09G 3/006
2021/0247859 A1* 8/2021 Gong ..................... G09G 3/006
2022/0084894 A1* 3/2022 Huang ............... G01R 31/2812

* cited by examiner

DISPLAY DEVICE

This application claims priority to Korean Patent Application No. 10-2022-0027658, filed on Mar. 3, 2022, and all the benefits accruing therefrom under 35 U.S.C. § 119, the content of which in its entirety is herein incorporated by reference.

BACKGROUND

1. Field of Disclosure

The present disclosure relates to a display device. More particularly, the present disclosure relates to a display device with improved operational reliability.

2. Description of the Related Art

Various display devices that are applied to multimedia devices, such as televisions, mobile phones, tablet computers, navigation units, and game units, are being developed.

As the fields of use of the display devices are diversified, types of display panels used to display images on the display devices are diversified.

The display panel includes a light emitting type display panel, and the light emitting type display panel includes an organic light emitting display panel, an inorganic light emitting display panel, or a quantum dot light emitting display panel.

SUMMARY

The present disclosure provides a display device including a connection detection circuit that inspects a connection status of a connector connecting multiple substrate connected to a display panel.

The present disclosure provides a display device for controlling a voltage applied to the display panel to secure operation stability of the display panel.

The present disclosure provides a display device for detecting a connection resistance of a connection portion of a connector and controlling a voltage applied to the display panel when the detected connection resistance exceeds a predetermined reference resistance to secure operation stability of the display panel.

Embodiments of the invention provide a display device including: a display panel including a plurality of pixels for displaying an image, a first circuit board connected to the display panel and for providing a first signal to the display panel, a second circuit board for providing a second signal to the first circuit board, and a connection board for electrically connecting the first circuit board to the second circuit board and including a connection portion connected to the first circuit board and the second circuit board. The second circuit board includes a connection detection circuit, which detects a connection status of the connection portion and generates a detection signal.

The second circuit board may generate the second signal based on an image signal applied thereto from an outside, and the first circuit board may generate the first signal based on the second signal and provides the first signal to the display panel.

The second circuit board may further include a voltage generator, which generates a plurality of voltages for an operation of the display panel, and the voltages include a first power source voltage, a second power source voltage, and a first voltage applied to the connection detection circuit and the connection portion for a connection detection.

The second circuit board may further include a controller, and the controller may receive the detection signal and determine the connection status of the connection portion as a normal status or an error status based on the detection signal applied thereto.

The controller may apply a protection signal to the voltage generator to stop the generation of the voltages when the connection status is determined as the error status.

The connection detection circuit may compare a predetermined reference voltage with a detection voltage detected according to a difference between the first voltage applied to a first end of the connection portion and a second voltage of a second end of the connection portion, generate a first detection signal when the detection voltage is higher than the reference voltage, and generate a second detection signal when the detection voltage is lower than the reference voltage, and the second end of the connection portion may be opposite to the first end.

The connection detection circuit may include a detection line connected to the voltage generator, a first node and a second node, and passing through the connection portion between the first and second nodes, and the connection portion may include a plurality of contact portions through which the detection line passes.

The connection detection circuit may further include a first controller, whose opposite ends are connected to the first node and the second node, respectively, and the first voltage may be applied to the first node, the second voltage may be applied to the second node, and the contact portions may be disposed between the first node and the second node.

The first controller may calculate a voltage difference between the first voltage and the second voltage, which are changed depending on a plurality of connection resistors of the contact portions, and amplify the calculated voltage difference to generate a detection voltage.

The connection detection circuit may further include a second controller, which compares the detection voltage with a predetermined reference voltage, generate a first detection signal when the detection voltage is higher than the predetermined reference voltage, and generate a second detection signal when the detection voltage is lower than the predetermined reference voltage.

The connection detection circuit may further include a sensing resistor, and the sensing resistor may be connected to the second node.

The connection portion may include a first power source voltage line and a second power source voltage line, which are disposed in first areas defined at opposite ends of the connection portion, respectively, the first power source voltage may be applied to the first power source voltage line, the second power source voltage may be applied to the second power source voltage line, and the contact portions may be disposed in a second area defined between the first areas to be adjacent to the first areas.

The connection detection circuit may include a first controller, which detects a voltage difference between a first node to which the first voltage is applied and a second node to which a second voltage is applied, compares the detected voltage difference with a reference voltage difference, generates a first detection signal when the voltage difference is greater than the reference voltage difference, and generates a second detection signal when the voltage difference is smaller than the reference voltage difference, and the second voltage may be different from the first voltage according to connection resistors of the connection portion.

The reference voltage difference may be variably determined, and when the reference voltage difference is changed, sizes of the connection resistors are variably determined depending on the changed reference voltage difference.

Embodiments of the invention provide a display device including: a display panel including a plurality of pixels for displaying an image; a first circuit board electrically connected to the display panel; a second circuit board electrically connected to the display panel; a connection board including a connection portion connecting the first circuit board to the second circuit board; a connection detection circuit disposed on the second circuit board, and which detects a connection status of the connection portion, and generates a detection signal; a voltage generator, which generates a power source voltage applied to the display panel and a first voltage applied to the connection detection circuit; and a controller connected to the connection detection circuit and which determines the connection status based on the detection signal applied thereto.

The connection detection circuit may include a first controller, which detects a voltage difference between a first end of the connection portion to which the first voltage is applied and a second end of the connection portion to which the second voltage is applied. The second voltage may be determined from the first voltage depending on a voltage drop due to a plurality of connection resistors of the connection portion.

The display device may further include a second controller, which compares a detection voltage obtained by amplifying the voltage difference from the first controller with a predetermined reference voltage, generates a first detection signal when the detection voltage is greater than the reference voltage, and generates a second detection signal when the detection voltage is smaller than the reference voltage.

The first controller may compare the voltage difference with a predetermined reference voltage difference, generate a first detection signal when the voltage difference is greater than the reference voltage difference, and generate a second detection signal when the voltage difference is smaller than the reference voltage difference, and the controller may determine that the connection status is an error status when receiving the first detection signal and determine that the connection status is a normal status when receiving the second detection signal.

The first circuit board may be provided in plural, the connection board may be provided in plural, the connection detection circuit may be provided in plural, the plurality of connection boards may connect the first circuit boards and the second circuit board, respectively, and each of the plurality of connection detection circuits may detect the connection status of each of the connection boards.

The connection resistors are connected to each other in series.

According to the above, the display device detects the connection status of the connector that connects the circuit boards connected to the display panel, and when the detected connection status is determined as the error state, the display device controls the voltage applied to the display panel. Thus, the reliability of the display panel is effectively secured.

According to the above, the display device detects the connection resistance of the connection resistor of the connection portion included in the connector, and when the detected connection resistance exceeds the predetermined reference resistance, the display device is operated in a protection mode in which the voltage is not applied to the display panel. Thus, the reliability of the display panel is effectively secured.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
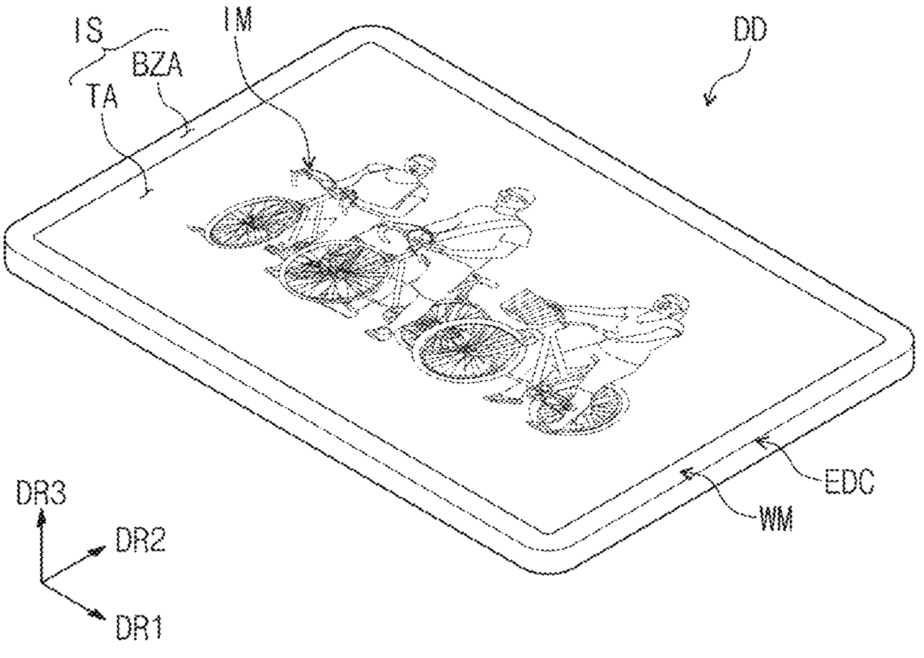
FIG. 1 is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, embodiments of the present disclosure will be described with reference to accompanying drawings.

Figure 2:
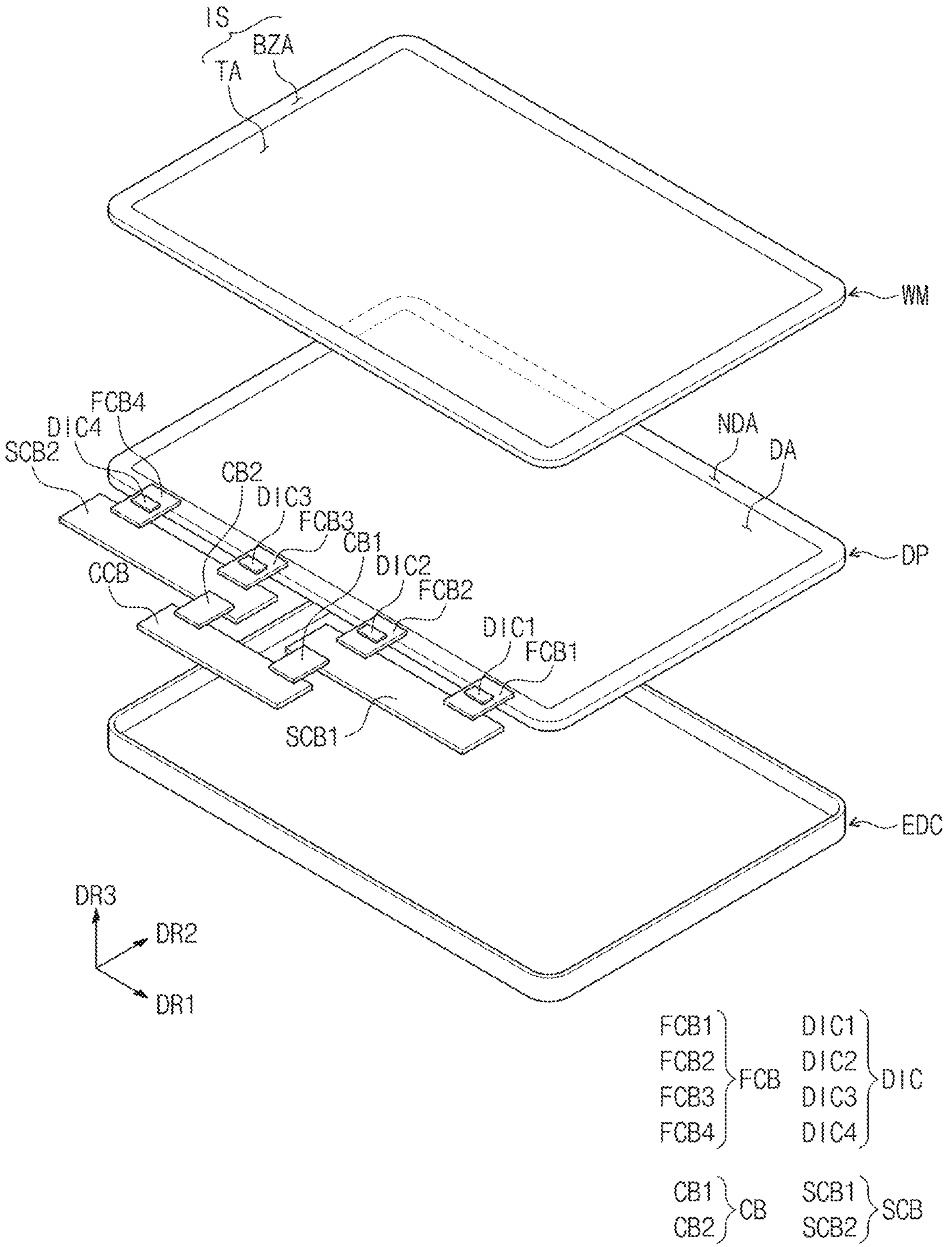
FIG. 2 is an exploded perspective view of a display device according to an embodiment of the present disclosure.

FIG. 1 is a perspective view of a display device DD according to an embodiment of the present disclosure. FIG. 2 is an exploded perspective view of the display device DD according to an embodiment of the present disclosure.

Referring to FIGS. 1 and 2, the display device DD may be a device that is activated in response to an electrical signal. The display device DD may be applied to a large-sized display device, such as a television set or a monitor, and a small and medium-sized display device, such as a mobile phone, a tablet computer, a car navigation unit, or a game unit. However, these are merely examples, and the display device DD may be applied to other electronic devices as long as they do not depart from the concept of the present disclosure. FIG. 1 shows a tablet type display device DD, however, the display device DD should not be limited thereto or thereby.

The display device DD may have a rectangular shape defined by long sides extending in a first direction DR1 and short sides extending in a second direction DR2 crossing the first direction DR1. However, the shape of the display device DD should not be limited to the rectangular shape, and the display device DD may have a variety of shapes. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

In the present embodiment, front (or upper) and rear (or lower) surfaces of each member may be defined with respect to the direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Directions indicated by the first, second, and third directions DR1, DR2, and DR3 may be relative each other and may be changed to other directions.

The display device DD may sense an external input applied thereto from the outside. The external input may include various forms of inputs provided from the outside of the display device DD. The display device DD according to an embodiment of the present disclosure may sense an external input applied thereto from the outside by a user. The external input by the user may include one of various forms of external inputs, such as a part of the user's body, light, heat, or pressure, or a combination thereof. In addition, the display device DD may sense the external input by the user applied to a side or rear surface thereof depending on a structure of the display device DD, and the present disclosure should not be limited to a particular embodiment.

According to an embodiment, the display device DD may sense inputs generated by an input device, e.g., a stylus pen, an active pen, a touch pen, an electronic pen, or the like, in addition to the input by the user.

The front surface of the display device DD may include a transmission area TA and a bezel area BZA. The transmission area TA may be an area through which the image IM is displayed. The user may view the image IM through the transmission area TA. In the present embodiment, the transmission area TA may have a quadrangular shape with rounded vertices, however, this is merely an example. The transmission area TA may have a variety of shapes and should not be particularly limited.

The bezel area BZA may be defined adjacent to the transmission area TA. The bezel area BZA may have a predetermined color. The bezel area BZA may surround the transmission area TA. Accordingly, the transmission area TA may have a shape defined by the bezel area BZA, however, this is merely an example. According to an embodiment, the bezel area BZA may be disposed adjacent to only one side of the transmission area TA or may be omitted. The display device DD may include various embodiments and should not be particularly limited.

Referring to FIG. 2, the display device DD may include a window WM, a display panel DP, and an external case EDC.

The window WM may include a transparent material that transmits the image IM. As an example, the window WM may include a glass, sapphire, or plastic material in an embodiment. The window WM may have a single-layer structure, however, it should not be limited thereto or thereby, and the window WM may include a plurality of layers.

Although not shown in figures, the bezel area BZA of the display device DD may be defined by printing a material having a predetermined color on an area of the window WM. As an example, the window WM may include a light blocking pattern to define the bezel area BZA in an embodiment. The light blocking pattern may be a colored organic layer and may be formed by a coating method.

The window WM may be coupled with the display panel DP by an adhesive film. As an example, the adhesive film may include an optically clear adhesive ("OCA") film in an embodiment. However, the adhesive film should not be limited thereto or thereby, and the adhesive film may include an ordinary adhesive. For example, the adhesive film may include an optically clear resin ("OCR") or a pressure sensitive adhesive ("PSA") film in another embodiment.

An anti-reflective layer may be further disposed between the window WM and the display panel DP. The anti-reflective layer may reduce a reflectance with respect to an external light incident thereto from the above of the window WM. According to an embodiment of the present disclosure, the anti-reflective layer may include a retarder and a polarizer. The retarder may be a film type or liquid crystal coating type and may include a λ/2 retarder and/or a λ/4 retarder. The polarizer may be a film type or liquid crystal coating type. The film type retarder and the film type polarizer may include a stretching type synthetic resin film, and the liquid crystal coating type retarder and the liquid crystal coating type polarizer may include liquid crystals aligned in a predetermined alignment. The retarder and the polarizer may be implemented as one polarizing film.

As an example, the anti-reflective layer may include color filters. Arrangements of the color filters may be determined by taking into account colors of lights generated by a plurality of pixels PX11 to PXnm (refer to FIG. 3) included in the display panel DP in an embodiment. The anti-reflective layer may further include a light blocking pattern.

The display panel DP may include a display area DA displaying the image IM and a non-display area NDA adjacent to the display area DA. The display area DA may be an area through which the image IM is displayed. The non-display area NDA may surround the display area DA, however, this is merely an example. According to an embodiment, the non-display area NDA may have a variety of shapes and should not be particularly limited. As an example, the non-display area NDA may be disposed adjacent to one side or opposite sides of the display area DA in an embodiment. According to an embodiment, the display area DA of the display device DD may correspond to at least a portion of the transmission area TA, and the non-display area NDA of the display device DD may correspond to the bezel area BZA.

According to an embodiment, the display panel DP may be a light-emitting type display panel. As an example, in an embodiment, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, the organic light emitting display panel will be described as the display panel DP.

As an example, in an embodiment, the display device DD may further include an input sensing layer to sense the external input, e.g., a touch event. The input sensing layer may be disposed directly on the display panel DP. According to an embodiment, the input sensing layer may be formed on the display panel DP through successive processes. That is, when the input sensing layer is disposed directly on the display panel DP, an adhesive film may not be disposed between the input sensing layer and the display panel DP. However, the adhesive film may be disposed between the input sensing layer and the display panel DP. In this case, the input sensing layer may not be manufactured together with the display panel DP through the successive processes. That is, the input sensing layer may be fixed to an upper surface of the display panel DP by the adhesive film after being manufactured through a separate process from the display panel DP.

The display device DD may further include a first circuit board SCB, a second circuit board CCB, a plurality of connection boards CB, a plurality of flexible circuit films FCB, and a plurality of driving chips DIC. The connection boards CB may be referred to as a plurality of connectors. The connection boards CB may be a board including circuitry or a cable including wires. For example, the connection boards CB may be a flexible printed circuit (FPC) or a flexible flat cable (FFC).

The first circuit board SCB may be referred to as a source circuit board. The source circuit board SCB may be provided in plural. The source circuit boards SCB may be connected to the flexible circuit films FCB and may be electrically connected to the display panel DP. The flexible circuit films FCB may be connected to the display panel DP and may electrically connect the display panel DP to the source circuit boards SCB.

The second circuit board CCB may be referred to as a control circuit board CCB. The control circuit board CCB may be connected to the connectors CB and may be electrically connected to the source circuit boards SCB. The control circuit board CCB may be electrically connected to the display panel DP via the connectors CB, the source circuit board SCB, and the flexible circuit films FCB.

The control circuit board CCB and the source circuit boards SCB may include a plurality of driving elements. The driving elements may include a circuit part to drive the display panel DP. The driving chips DIC may be mounted on the flexible circuit films FCB.

As an example, in an embodiment, the source circuit boards SCB may include a first source circuit board SCB1 and a second source circuit board SCB2. The connectors CB may include a first connector CB1 and a second connector CB2. The flexible circuit films FCB may include a first flexible circuit film FCB1, a second flexible circuit film FCB2, a third flexible circuit film FCB3, and a fourth flexible circuit film FCB4. The driving chips DIC may include a first driving chip DIC1, a second driving chip DIC2, a third driving chip DIC3, and a fourth driving chip DIC4.

The first source circuit board SCB1 and the second source circuit board SCB2 may be disposed spaced apart from each other in the first direction DR1. The control circuit board CCB may be electrically connected to the first source circuit board SCB1 via the first connector CB1. The control circuit board CCB may be electrically connected to the second source circuit board SCB2 via the second connector CB2.

The first connector CB1 may be referred to as a first connection board CB1. The second connector CB2 may be referred to as a second connection board CB2. Each of the first connection board CB1 and the second connection board CB2 may be a flexible flat cable. The flexible flat cable may connect the source circuit boards SCB to the control circuit board CCB. According to an embodiment, the first connector CB1 and the second connector CB2 may indicate a connection portion of the flexible flat cable.

In the present disclosure, the first connector CB1 and the second connector CB2 may indicate the flexible flat cable including the connection portion.

The first and second flexible circuit films FCB1 and FCB2 may be disposed spaced apart from each other in the first direction DR1 and may be connected to the display panel DP, and thus, the first and second flexible circuit films FCB1 and FCB2 may electrically connect the display panel DP to the first source circuit board SCB1. The first driving chip DIC1 may be mounted on the first flexible circuit film FCB1. The second driving chip DIC2 may be mounted on the second flexible circuit film FCB2.

The third and fourth flexible circuit films FCB3 and FCB4 may be disposed spaced apart from each other in the first direction DR1 and may be connected to the display panel DP, and thus, the third and fourth flexible circuit films FCB3 and FCB4 may electrically connect the display panel DP to the second source circuit board SCB2. The third driving chip DIC3 may be mounted on the third flexible circuit film FCB3. The fourth driving chip DIC4 may be mounted on the fourth flexible circuit film FCB4.

However, the present disclosure should not be limited thereto or thereby. As an example, in an embodiment, the source circuit boards SCB may include three or more source circuit boards. In this case, the control circuit board CCB may be electrically connected to three or more source circuit boards. In addition, the connectors CB may include three or more connectors. As an example, in a case where the connectors CB include four connectors, the control circuit board CCB may be electrically connected to the first and second source circuit boards SCB1 and SCB2 through two connectors, respectively.

The external case EDC may be coupled with the window WM to define an appearance of the display device DD. The external case EDC may absorb impacts applied thereto from the outside and may prevent foreign substance and moisture from entering the display module DM to protect components accommodated in the external case EDC. As an example, in an embodiment, the external case EDC may be provided in a form in which a plurality of storage members is combined with each other.

According to an embodiment, the display device DD may further include an electronic module including various functional modules to operate the display panel DP, a power supply module supplying a power for an overall operation of the display device DD, and a bracket coupled to the external case EDC to divide an inner space of the display device DD.

Figure 3:
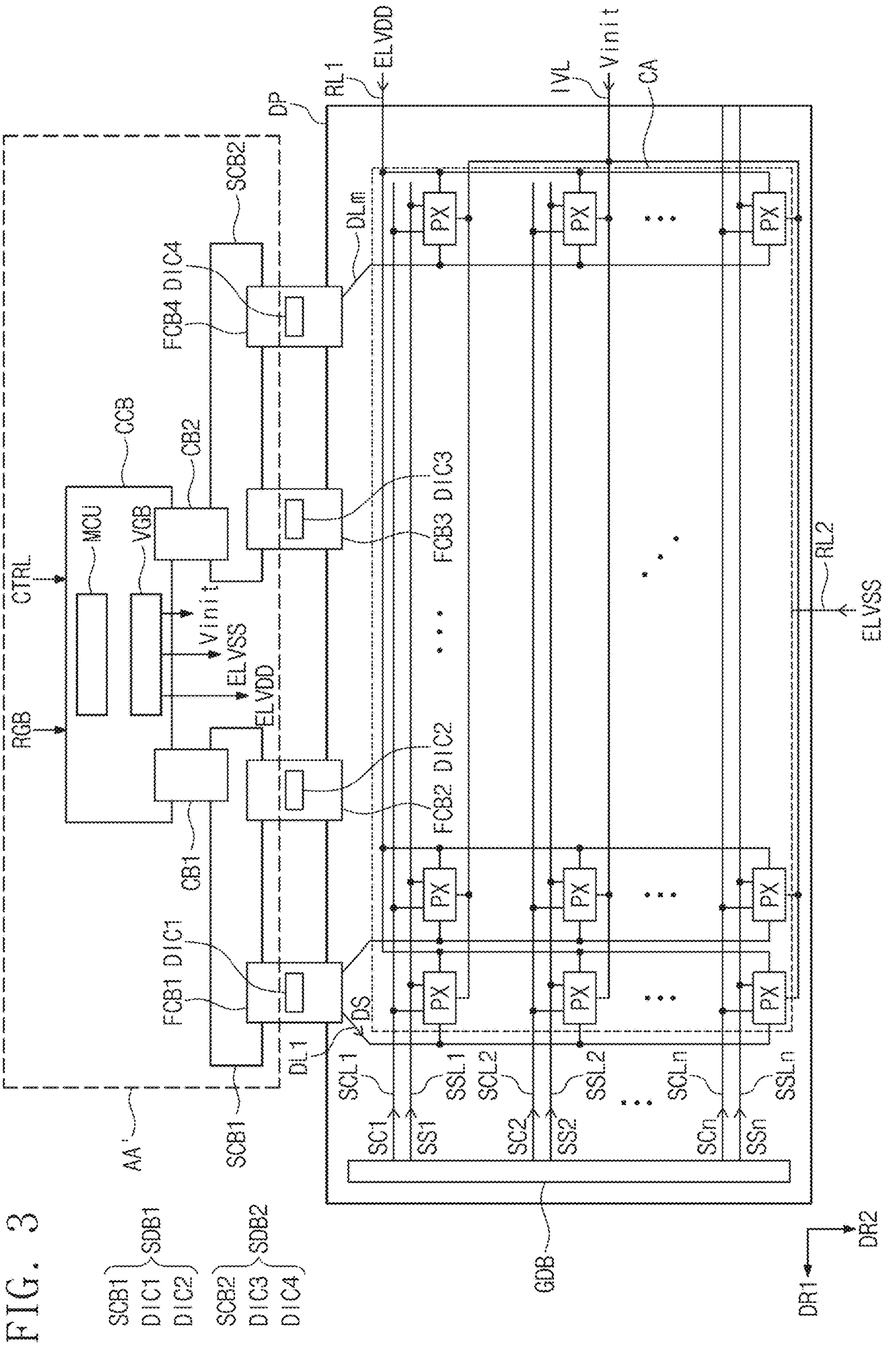
FIG. 3 is a block diagram of a display device according to an embodiment of the present disclosure.

FIG. 3 is a block diagram of the display device DD according to an embodiment of the present disclosure. In FIG. 3, the same reference numerals denote the same elements in FIG. 2, and thus, detailed descriptions of the same elements will be omitted.

Referring to FIG. 3, the display device DD may include the display panel DP, the control circuit board CCB, the first source circuit board SCB1, the second source circuit board SCB2, a gate driving block GDB, the first connector CB1, the second connector CB2, the first, second, third, and fourth flexible circuit films FCB1, FCB2, FCB3, and FCB4, the first, second, third, and fourth driving chips DIC1, DIC2, DIC3, and DIC4, a voltage generator VGB, and a controller MCU.

As an example, in an embodiment, the control circuit board CCB may receive image signals RGB and an external control signal CTRL from the outside. The external control signal CTRL may include a vertical synchronization signal, a horizontal synchronization signal, and a main clock. The control circuit board CCB may convert a data format of the image signals RGB into a data format appropriate to an interface with the first and second source circuit boards SCB1 and SCB2 and the first to fourth driving chips DIC1 to DIC4 to generate image data. Hereinafter, for the convenience of explanation, a unit including the first source circuit board SCB1 and the first and second driving chips DIC1 and DIC2 will be referred to as a first source driver SDB1. In addition, a unit including the second source circuit board SCB2 and the third and fourth driving chips DIC3 and DIC4 will be described as a second source driver SDB2. The control circuit board CCB may generate a control signal in response to the external control signal CTRL. The control signal may include a source control signal and a gate control signal.

The control circuit board CCB may provide the image data and the source control signal to the first and second source drivers SDB1 and SDB2. The source control signal may include a horizontal start signal to start an operation of the first and second source drivers SDB1 and SDB2. The first and second source drivers SDB1 and SDB2 may generate data signals DS based on the image data in response to the source control signal. The first and second source drivers SDB1 and SDB2 may output the data signals DS to a plurality of data lines DL1 to DLm. The data signals DS may be analog voltages corresponding to grayscale values of the image data.

The gate driving block GDB may receive the gate control signal from the control circuit board CCB. The gate control signal may include a vertical start signal to start an operation of the gate driving block GDB and a scan clock signal to determine an output timing of scan signals SC1 to SCn and initialization signals SS1 to SSn. The gate driving block GDB may generate the scan signals SC1 to SCn and the initialization signals SS1 to SSn in response to the gate control signal. The gate driving block GDB may sequentially output the scan signals SC1 to SCn to a plurality of scan lines SCL1 to SCLn described later and may sequentially output the initialization signals SS1 to SSn to a plurality of initialization lines SSL1 to SSLn described later.

The control circuit board CCB may include the voltage generator VGB. The voltage generator VGB may generate voltages for the operation of the display panel DP.

As an example, in an embodiment, the voltage generator VGB may generate a first power source voltage ELVDD, a second power source voltage ELVSS, and an initialization voltage Vinit. The voltage generator VGB may operate in response to a control of the control circuit board CCB. As an example, the first power source voltage ELVDD may have a voltage level greater than a voltage level of the second power source voltage ELVSS. As an example, the voltage level of the first power source voltage ELVDD may be within a range from about 20V to about 30V. The initialization voltage Vinit may have a voltage level smaller than a voltage level of the second power source voltage ELVSS. As an example, the voltage level of the initialization voltage Vinit may be within a range from about 1V to about 9V. The voltage generator VGB may generate an initial detection voltage that is provided for detection to a detection circuit. The initial detection voltage may be applied to a detection line, and the detection line may cross the connector CB. That is, a current flowing through the detection line may flow from the voltage generator VGB to the control circuit board CCB via the connector CB.

The control circuit board CCB may include the controller MCU. The controller MCU may generate various driving signals for the operation of the display panel DP. As an example, the controller MCU may generate driving signals that control ON/OFF of the display panel DP.

As an example, in an embodiment, the controller MCU may operate in response to a control by the control circuit board CCB. The controller MCU may apply a signal to the voltage generator VGB in addition to the display panel DP. The controller MCU may generate a signal to control ON/OFF of the voltage generator VGB. The controller MCU may generate driving signals to turn on or turn off the voltage generator VGB based on a connection status of the connectors CB. As an example, when the connection status of the connectors CM is in an error status, the controller MCU may generate a signal to turn off the voltage generator VGB and may apply the signal to the voltage generator VGB.

As an example, in an embodiment, the display panel DP may include the scan lines SCL1 to SCLn, the initialization lines SSL1 to SSLn, the data lines DL1 to DLm, and the pixels PX. The scan lines SCL1 to SCLn and the initialization lines SSL1 to SSLn may extend from the gate driving block GDB to a direction opposite to the first direction DR1 and may be arranged to be spaced apart from each other in the second direction DR2. The data lines DL1 to DLm may extend from the first and second source drivers SDB1 and SDB2 to the second direction DR2 and may be arranged spaced apart from each other in the first direction DR1.

Each of the pixels PX may be electrically connected to a corresponding scan line among the scan lines SCL1 to SCLn and a corresponding initialization line among the initialization lines SSL1 to SSLn. In addition, each of the pixels PX may be electrically connected to a corresponding data line among the data lines DL1 to DLm.

Each of the pixels PX may be electrically connected to a first power line RL1, a second power line RL2, and an initialization power line IVL. The first power line RL1 may receive the first power source voltage ELVDD from the voltage generator VGB. The second power line RL2 may receive the second power source voltage ELVSS from the voltage generator VGB. The initialization power line IVL may receive the initialization voltage Vinit from the voltage generator VGB. However, as an example, a connection relationship between the pixels PX and the scan lines SCL1 to SCLn, the initialization lines SSL1 to SSLn and the data lines DL1 to DLm may be changed depending on a configuration of a driving circuit of the pixels PX.

The pixels PX may be grouped into a plurality of groups that includes organic light emitting diodes generating different color lights from each other. For instance, the pixels may include red pixels generating a red light, green pixels generating a green light, and blue pixels generating a blue light. The organic light emitting diode of the red pixel, the organic light emitting diode of the green pixel, and the organic light emitting diode of the blue pixel may include light emitting layers containing different materials from each other. According to an embodiment, each of the pixels PX may include white pixels generating a white light. In this case, the anti-reflective layer included in the display device DD may further include the color filters. The display device DD may display the image IM (refer to FIG. 1) based on lights obtained when the white light passes through the color filters. However, according to an embodiment, the pixels PX may include only the blue pixels generating the blue light. In this case, the display device DD may display the image IM based on lights obtained when the blue light passes through the color filters. As an example, in a case where the blue light passes through the color filters, the light passed through the color filters may have a wavelength different from a wavelength of the blue light. According to an embodiment, the color filters may include the quantum dot. The quantum dot may be a particle that controls a wavelength of a light emitted therefrom by converting a wavelength of a light incident thereto. The quantum dot may control the wavelength of the light emitted therefrom according to its size, and accordingly, the quantum dot may emit a red light, a green light, and a blue light.

The organic light emitting diode included in each pixel PX may include a cathode CA. The cathode CA may be electrically connected to the second power line RL2 and may receive the second power source voltage ELVSS from the voltage generator VGB. Alternatively, cathodes CA included in the pixels PX may be formed integrally with each other to form a common cathode. As an example, the common cathode may be formed to overlap two or more pixels.

Figure 4:
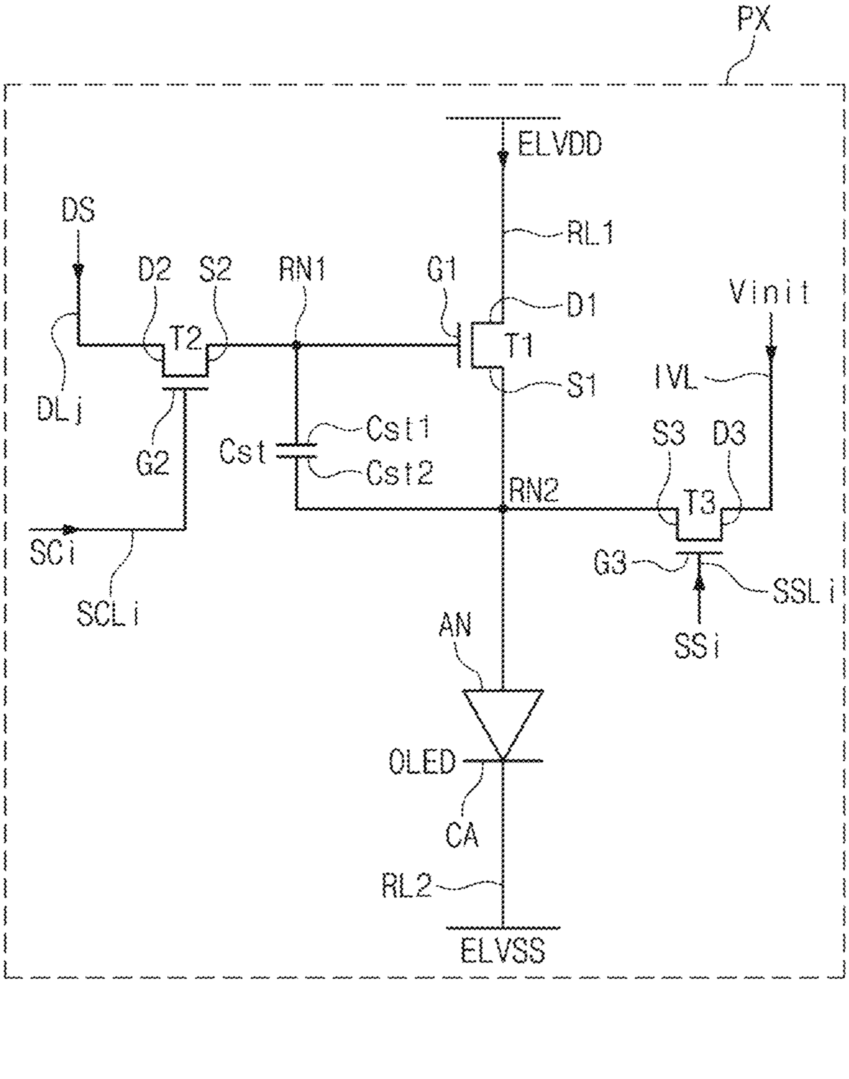
FIG. 4 is an equivalent circuit diagram of a pixel according to an embodiment of the present disclosure.

FIG. 4 is an equivalent circuit diagram of the pixel PX according to an embodiment of the present disclosure.

Referring to FIG. 4, the pixel PX connected to an i-th scan line SCLi among the scan lines SCL1 to SCLn, an i-th initialization line SSLi among the initialization lines SSL1 to SSLn, and a j-th data line DLj among the data lines DL1 to DLm is shown as a representative example.

As an example, in an embodiment, the pixel PX may include first, second, and third transistors T1, T2, and T3, a capacitor Cst, and a light emitting diode OLED. In the present embodiment, each of the first, second, and third transistors T1, T2, and T3 will be described as an N-type transistor, however, the present disclosure should not be limited thereto or thereby. Each of the first, second, and third transistors T1, T2, and T3 may be implemented as a P-type transistor or the N-type transistor. In the present disclosure, the expression "a transistor is connected to a signal line" means that one electrode of a source electrode, a drain electrode, and a gate electrode of the transistor is provided integrally with the signal line or connected to the signal line via a connection electrode. In addition, the expression "a transistor is electrically connected to another transistor" means that one electrode of a source electrode, a drain electrode, and a gate electrode of the transistor is provided integrally with one electrode of a source electrode, a drain electrode, and a gate electrode of another transistor or connected to one electrode of the source electrode, the drain electrode, the gate electrode of another transistor via a connection electrode.

In the present embodiment, the first transistor T1 may be a driving transistor, and the second transistor T2 may be a switching transistor. The third transistor T3 may be an initialization transistor. Hereinafter, each of the first to third transistors T1 to T3 may include a first electrode, a second electrode, and a control electrode, the first electrode may be referred to as a source electrode, the second electrode may be referred to as a drain electrode, and the control electrode may be referred to as a gate electrode.

The first transistor T1 may be connected between the first power line RL1 and the light emitting diode OLED. A source electrode S1 of the first transistor T1 may be electrically connected to an anode AN of the light emitting diode OLED. A drain electrode D1 of the first transistor T1 may be electrically connected to the first power line RL1. A gate electrode G1 of the first transistor T1 may be electrically connected to a first reference node RN1. The first reference node RN1 may be a node that is electrically connected to a source electrode S2 of the second transistor T2. As an example, the first power source voltage ELVDD may be applied to the drain electrode D1 of the first transistor T1 via the first power line RL1.

The second transistor T2 may be connected between the j-th data line DLj and the gate electrode G1 of the first transistor T1. The source electrode S2 of the second transistor T2 may be electrically connected to the gate electrode G1 of the first transistor T1. A drain electrode D2 of the second transistor T2 may be electrically connected to the j-th data line DLj. A gate electrode G2 of the second transistor T2 may be electrically connected to the i-th scan line SCLi. As an example, an i-th scan signal SCi may be applied to the gate electrode G2 of the second transistor T2 via the i-th scan line SCLi. The data signal DS may be applied to the drain electrode D2 of the second transistor T2 via the j-th data line DLj.

The third transistor T3 may be connected between a second reference node RN2 and the initialization power line IVL. A source electrode S3 of the third transistor T3 may be electrically connected to the second reference node RN2. The second reference node RN2 may be a node that is electrically connected to the source electrode S1 of the first transistor T1. In addition, the second reference node RN2 may be a node that is electrically connected to the anode AN of the light emitting diode OLED. A drain electrode D3 of the third transistor T3 may be electrically connected to the initialization power line IVL. A gate electrode G3 of the third transistor T3 may be electrically connected to the i-th initialization line SSLi. As an example, an i-th initialization signal SSi may be applied to the gate electrode G3 of the third transistor T3 via the i-th initialization line SSLi. The initialization voltage Vinit may be applied to the drain electrode D3 of the third transistor T3 via the initialization power line IVL.

The light emitting diode OLED may be connected between the second reference node RN2 and the second power line RL2. The anode AN of the light emitting diode OLED may be electrically connected to the second reference node RN2. A cathode CA of the light emitting diode OLED may be electrically connected to the second power line RL2.

The capacitor Cst may be connected between the first reference node RN1 and the second reference node RN2. A first electrode Cst1 of the capacitor Cst may be electrically connected to the first reference node RN1, and a second electrode Cst2 of the capacitor Cst may be electrically connected to the second reference node RN2.

Referring to FIG. 3, the gate driving block GDB may sequentially apply the scan signals SC1 to SCn and the initialization signals SS1 to SSn to the display panel DP. Each of the scan signals SC1 to SCn and the initialization signals SS1 to SSn may have a high level for some sections and may have a low level for some sections. In this case, N-type transistors may be turned on when corresponding signals have the high level, and P-type transistors may be turned on when corresponding signals have the low level. Hereinafter, the pixel PX including the N-type first, second, and third transistors T1, T2, and T3 shown in FIG. 4 will be described as a representative example.

When the i-th initialization signal SSi has the high level, the third transistor T3 may be turned on. When the third transistor T3 is turned on, the initialization voltage Vinit may be transmitted to the second reference node RN2 via the third transistor T3. Accordingly, the second reference node RN2 may be initialized to the initialization voltage Vinit, and the source electrode S1 of the first transistor T1 and the anode AN of the light emitting diode OLED, which are electrically connected to the second reference node RN2, may be initialized to the initialization voltage Vinit.

When the i-th scan signal SCi has the high level, the second transistor T2 may be turned on. When the second transistor T2 is turned on, the data signal DS may be transmitted to the first reference node RN1 via the second transistor T2. Accordingly, the data signal DS may be applied to the gate electrode G1 of the first transistor T1 and the first electrode Cst1 of the capacitor Cst, which are electrically connected to the first reference node RN1. When the data signal DS is applied to the gate electrode G1 of the first transistor T1, the first transistor T1 may be turned on.

As an example, in an embodiment, a period during which the i-th initialization signal SSi has the high level may overlap a period during which the i-th scan signal SCi has the high level. In this case, the data signal DS and the initialization voltage Vinit may be applied to opposite ends of the capacitor Cst, and the capacitor Cst may be charged with electric charges corresponding to a voltage difference DS-Vinit between opposite ends thereof.

The second power source voltage ELVSS may be applied to the cathode CA of the light emitting diode OLED. Accordingly, when the i-th initialization signal SSi has the high level and the initialization voltage Vinit having the voltage level lower than the voltage level of the second power source voltage ELVSS is applied to the anode AN of the light emitting diode OLED, no current may flow through the light emitting diode OLED.

When the i-th scan signal SCi has the low level, the second transistor T2 may be turned off. When the i-th initialization signal SSi has the low level, the third transistor T3 may be turned off. As an example, a period during which the i-th scan signal SCi has the low level may overlap a period during which the i-th initialization signal SSi has the low level.

Although the second transistor T2 is turned off in response to the i-th scan signal SCi having the low level, the first transistor T1 may maintain the turn-on state by the electric charges charged in the capacitor Cst. Accordingly, a driving current may flow through the first transistor T1. Due to the driving current flowing in through the first transistor T1, a voltage level of the anode AN of the light emitting diode OLED may gradually increase. When the voltage level of the anode AN becomes higher than the voltage level of the cathode CA, the driving current may flow to the light emitting diode OLED, and the light emitting diode OLED may emit a light. In this case, although the voltage level of the second reference node RN2 increases, the voltage level of the first reference node RN1 may increase due to a coupling effect of the capacitor Cst, and thus, a level of the driving current flowing through the first transistor T1 may be maintained.

As an example, in an embodiment, referring to FIGS. 3 and 4, the voltage generator VGB included in the control circuit board CCB may provide the first power source voltage ELVDD, the second power source voltage ELVSS, and the initialization voltage Vinit to each of the pixels PX included in the display panel DP via the first connector CB1 and the first source driver SDB1. In addition, the voltage generator VGB included in the control circuit board CCB may provide the first power source voltage ELVDD, the second power source voltage ELVSS, and the initialization voltage Vinit to each of the pixels PX included in the display panel DP via the second connector CB2 and the second source driver SDB2.

Figure 5:
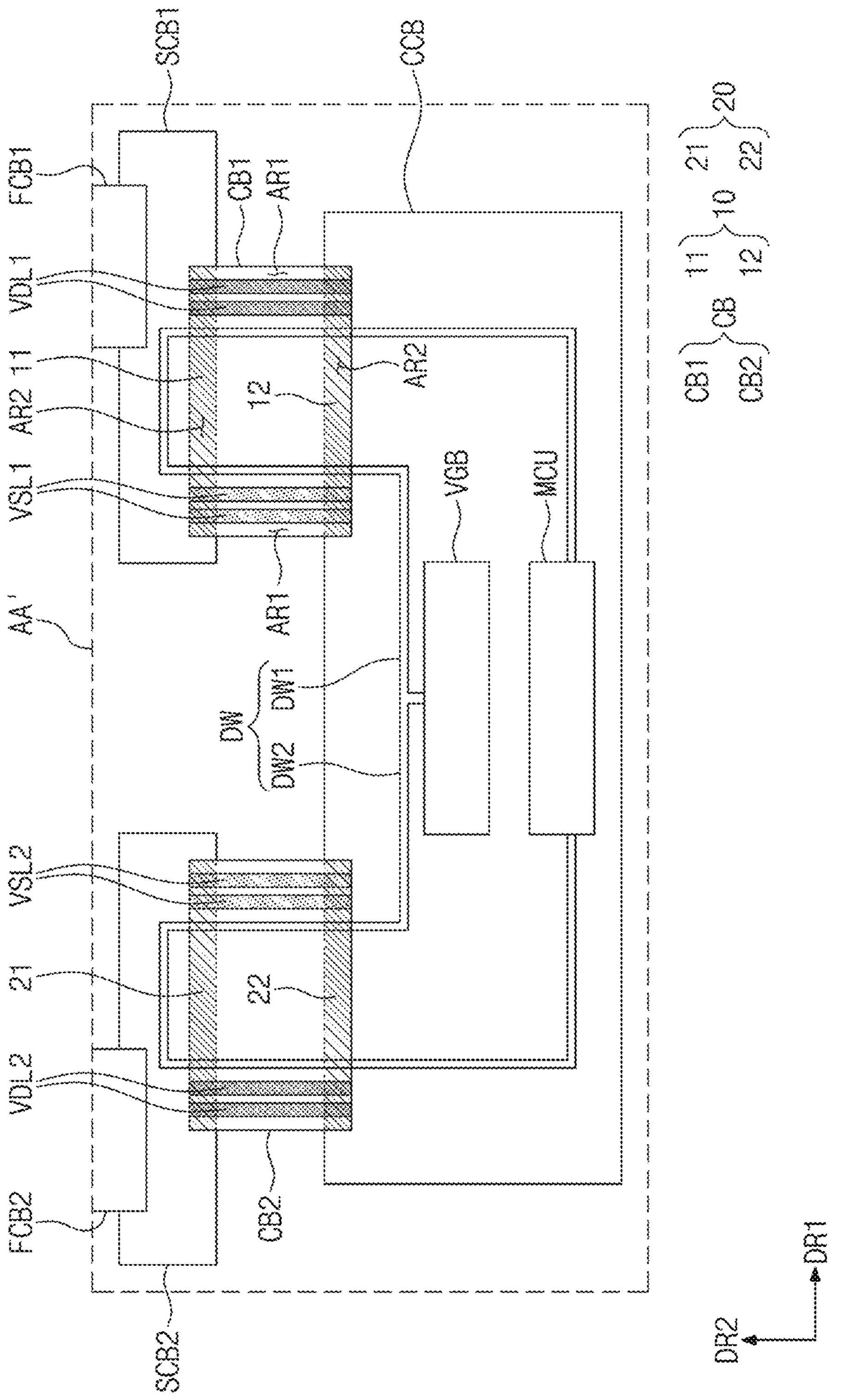
FIG. 5 is an enlarged plan view of an area AA' of FIG. 3.

FIG. 5 is an enlarged plan view of an area AA' of FIG. 3. In FIG. 5, the same reference numerals denote the same elements in FIGS. 3 and 4, and thus, detailed descriptions of the same elements will be omitted.

Referring to FIG. 5, the connectors CB may include connection portions 10 and 20. First power source voltage lines VDL1 and VDL2 and second power source voltage lines VSL1 and VSL2 may be disposed in the connector CB. The first power source voltage ELVDD (refer to FIG. 4) may be applied to the first power source voltage lines VDL1 and VDL2, and the second power source voltage ELVSS (refer to FIG. 4) may be applied to the second power source voltage lines VSL1 and VSL2. As an example, the first power source voltage ELVDD may be generated by the voltage generator VGB of the control circuit board CCB and may be applied to the first source circuit board SCB1 via the first power source voltage lines VDL1 and VLD2. The first power source voltage ELVDD may be applied to the first power line RL1 (refer to FIG. 3) of the display panel DP (refer to FIG. 2) via the first source circuit board SCB1.

The control circuit board CCB may include a detection line DW. The detection line DW may include a first detection line DW1 and a second detection line DW2. The detection line DW may connect the voltage generator VGB to the controller MCU of the control circuit board CCB. The detection line DW may pass through the connector CB between the voltage generator VGB and the controller MCU. The first detection line DW1 may pass through the first connector CB1, and the second detection line DW2 may pass through the second connector CB2.

The first connector CB1 may include a first connection portion 11 and a second connection portion 12. The second connector CB2 may include a third connection portion 21 and a fourth connection portion 22. The structure and function of the first connector CB1 may be substantially the same as those of the second connector CB2.

Hereinafter, the first connector CB1 will be described. All descriptions hereinafter may be applied to the second connector CB2.

The first connection portion 11 may connect the first connector CB1 to the first source circuit board SCB1. The second connection portion 12 may connect the first connector CB1 to the control circuit board CCB.

The first connector CB1 may include a first area AR1 and a second area AR2 defined therein. The first power source voltage line VDL1 and the second power source voltage line VSL1 may be formed in the first area AR1. The first area AR1 may correspond to an edge area of the first connector CB1. The second area AR2 may be defined between the first areas AR1. The second area AR2 may be defined in the first and second connection portions 11 and 12.

In a case where a connection status between the control circuit board CCB and the first connector CB1 is in the error status or a connection status between the first connector CB1 and the first source circuit board SCB1 is in the error status, the first power source voltage ELVDD applied to the first power source voltage line VDL1 by the voltage generator VGB may not be applied to the first source circuit board SCB1. In addition, in a case where a connection status between the control circuit board CCB and the second connector CB2 is in the error status or a connection status between the second connector CB2 and the second source circuit board SCB2 is in the error status, the first power source voltage ELVDD provided to the first power source voltage line VDL2 by the voltage generator VGB may not be applied to the second source circuit board SCB2. In this case, so as to display the image IM (refer to FIG. 1) through the display panel DP, the first power source voltage ELVDD is desirable to be applied to the first power line RL1 (refer to FIG. 4) using the first power source voltage ELVDD applied to one source circuit board normally connected to the control circuit board CCB among the first and second source circuit boards SCB1 and SCB2. In the case where the first power source voltage ELVDD is applied to the first power line RL1 via one source circuit board among the first and second source circuit boards SCB1 and SCB2, a current larger than a rated current of the display panel DP (refer to FIG. 2) may flow through a portion of the first power line RL1, which corresponds to the source circuit board providing the first power source voltage ELVDD. Accordingly, the display panel DP may be damaged. According to the present disclosure, the display device DD may include connection detection circuits 100 and 200 to detect the connection status of the connector CB, and thus, a stability of the display panel DP may be secured.

The first detection line DW1 may pass through the second area AR2. The first detection line DW1 may be disposed adjacent to the first area AR1 in the second area AR2.

The voltage generator VGB may apply a first voltage to the first detection line DW1. The voltage generator VGB may generate the first voltage that is an initial voltage used to detect the connection status of the connection portion 10 and may apply the first voltage to the first detection line DW1.

According to the display device DD (refer to FIG. 1), when a current flows through the first detection line DW1 to which the first voltage is applied, a voltage applied to the controller MCU after passing through the connection portion 10 may be different from the first voltage. According to the present disclosure, a resistance of the connection portion 10 may be detected based on a difference between the first voltage and the voltage applied to the controller MCU, and the connection status of the connection portion 10 may be determined as an error or normal status based on the detected resistance. This will be described in detail with reference to FIGS. 6 and 7.

Figure 6:
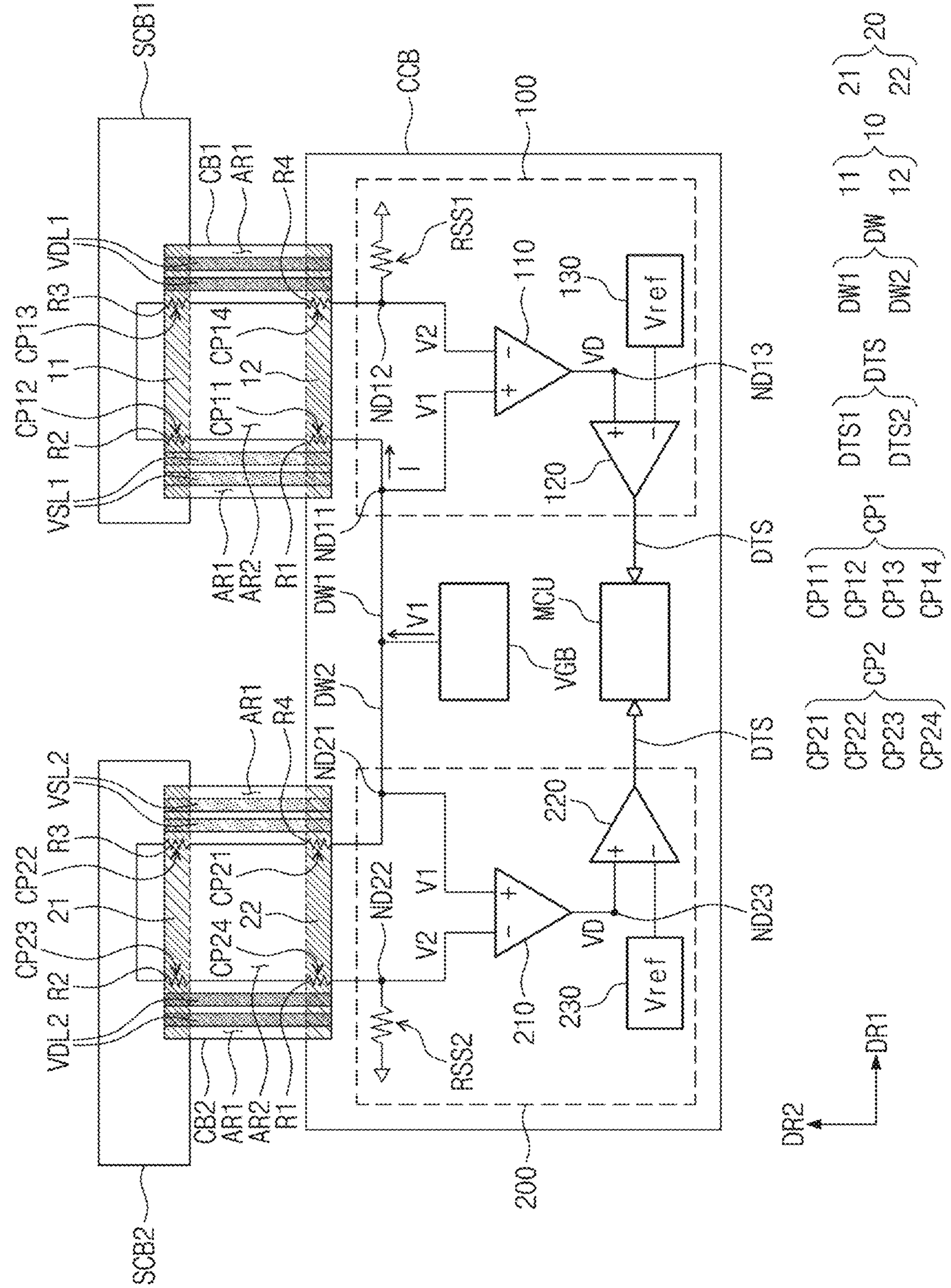
FIGS. 6 and 7 are views of a connection detection circuit of a display device according to embodiments of the present disclosure.
Figure 7:
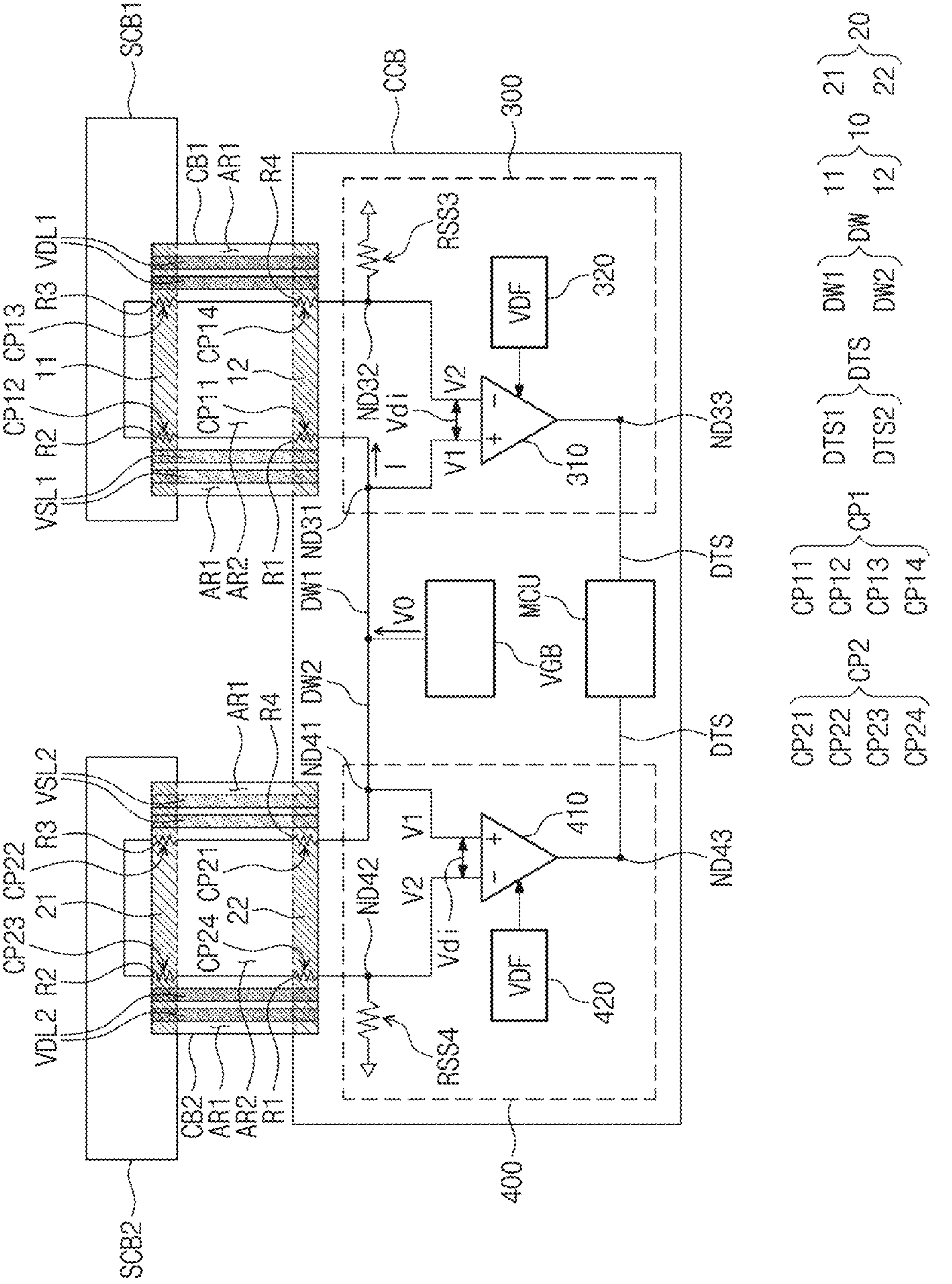

FIGS. 6 and 7 are views of connection detection circuits of a display device according to embodiments of the present disclosure. FIG. 6 shows the connection detection circuits 100 and 200 according to an embodiment of the present disclosure. FIG. 7 shows connection detection circuits 300 and 400 according to an embodiment of the present disclosure. The connection detection circuits may detect the connection status of connection portions 10 and 20 of a connector CB.

In FIG. 6, the connection detection circuits 100 and 200 may include a first connection detection circuit 100 and second connection detection circuit 200. The first connection detection circuit 100 may detect a connection status of the connection portion 10 of a first connector CB1, and the second connection detection circuit 200 may detect a connection status of the connection portion 20 of a second connector CB2. Hereinafter, the first connection detection circuit 100 will be described as a representative example. Descriptions about the first connection detection circuit 100 may be applied to the second connection detection circuit 200.

The first connection detection circuit 100 may generate a detection signal to determine whether the connection status of the connection portion 10 is in the error status or in the normal status. As an example, when the connection status of the connection portion is in the error status, the first connection detection circuit 100 may generate a first detection signal, and when the connection status of the connection portion 10 is in the normal status, the first connection detection circuit 100 may generate a second detection signal.

Referring to FIG. 6, a control circuit board CCB may include a voltage generator VGB, the connection detection circuits 100 and 200, and a controller MCU.

The voltage generator VGB and the controller MCU may be disposed between the first connection detection circuit 100 and the second connection detection circuit 200. The voltage generator VGB may be disposed between the first connection detection circuit 100 and the second connection detection circuit 200 and may apply a first voltage V1 to each of the first connection detection circuit 100 and the second connection detection circuit 200. As an example, the first voltage V1 may be about 3.3 voltages (V). The controller MCU may be disposed between the first connection detection circuit 100 and the second connection detection circuit 200 and may receive the detection signals generated by the first connection detection circuit 100 and the second connection detection circuit 200, respectively.

The first connection detection circuit 100 may compare voltages across opposite ends of a first detection line DW1 passing the first connector CB1 to determine whether the first connector CB1 is normally connected to a first source circuit board SCB1 and/or the control circuit board CCB. In detail, the first connection detection circuit 100 may detect a connection resistance of connection portions 11 and 12 using the first detection line DW1 passing through the connection portions 11 and 12 of the first connector CB1 and may determine whether the connection portion 10 is normally connected based on the detected resistance value.

The voltage generator VGB, the first connection detection circuit 100, and the controller MCU may be connected to each other via the first detection line DW1. The first detection line DW1 may connect the voltage generator VGB to the first connection detection circuit 100. The first connector CB1 may be disposed between the voltage generator VGB and the first connection detection circuit 100. A current may flow through the first detection line DW1 according to the first voltage V1 provided from the voltage generator VGB. The first detection line DW1 may pass through the first connector CB1. The first detection line DW1 may be connected to the first connection detection circuit 100 after passing through the connection portion 10 of the first connector CB1. The first detection line DW1 may include a first node ND11, a second node ND12, and first contact portions CP1.

The first node ND11 may be connected to one end of the first connector CB1. The second node ND12 may be connected to the other end of the first connector CB1. That is, a current I flowing through the first detection line DW1 may flow from the first node ND11 to the second node ND12 by passing through the connection portion 10 of the first connector CB1, due to the first voltage V1. The contact portions CP1 of the connection portion 10 may include a plurality of connection resistors R1, R2, R3, and R4. A first contact portion CP11 may include a first connection resistor R1, a second contact portion CP12 may include a second connection resistor R2, a third contact portion CP13 may include a third connection resistor R3, and a fourth contact portion CP14 may include a fourth connection resistor R4. The connection resistors R1 to R4 may be connected to each other in series. Accordingly, the total value of the connection resistors of the contact portions CP1 may be determined by a sum of the first to fourth connection resistors R1 to R4.

The first connection detection circuit 100 may generate the detection signal based on the voltage difference between the one end (i.e., the first node ND11) and the other end (i.e., the first node ND12) of the first connector CB'. That is, the first connection detection circuit 100 may generate the detection signal based on the difference between the first voltage V1 of the first node ND11 and a second voltage V2 of the second node ND12. The difference in voltage between the first node ND11 and the second node ND12 may be caused by the connection resistors R1 to R4. That is, the second voltage V2 may be smaller than the first voltage V1 by the connection resistors R1 to R4.

In detail, the first connection detection circuit 100 may include a first controller 110, a second controller 120, and a reference voltage generator 130.

The first controller 110 may include an amplifier. The first controller 110 may calculate the difference between the first voltage V1 and the second voltage V2 and may amplify the voltage difference with a certain gain. As an example, when the voltage difference between the first voltage V1 and the second voltage V2 is about 30.6 millivoltages (mV), the first controller 110 may amplify the voltage difference and may generate the detection voltage VD of about 3.06V.

The second controller 120 may include a comparator. The second controller 120 may compare the detection voltage VD detected by the first controller 110 with a reference voltage Vref.

The reference voltage generator 130 may be connected to one end of the second controller 120. The reference voltage generator 130 may generate the reference voltage Vref. As an example, the reference voltage Vref may be about 3.00V.

The second controller 120 may compare the detection voltage VD with the reference voltage Vref and may generate the detection signal. The second controller 120 may provide the generated detection signal DTS to the controller MCU. When the detection voltage VD is higher than the reference voltage Vref, the second controller 120 may generate a first detection signal DTS1. When the detection voltage VD is lower than the reference voltage Vref, the second controller 120 may generate a second detection signal DTS2. As an example, when the detection voltage VD is about 3.06V, the detection voltage VD may be higher than the reference voltage Vref of about 3.00V. In this case, the second controller 120 may generate the first detection signal DTS1 and may provide the first detection signal DTS1 to the controller MCU.

When the controller MCU receives the first detection signal DTS1 from the first connection detection circuit 100, the controller MCU may determine that the connection status of the connection portion 10 is in the error status, and when the controller MCU receives the second detection signal DTS2, the controller MCU may determine that the connection status of the connection portion 10 is in the normal status. When the connection status is in the error status, the controller MCU may be driven in a protection mode and may transmit a protection signal to the voltage generator VGB to stop generating the voltage. As an example, the controller MCU may be driven in the protection mode and may generate the protection signal. The controller MCU may provide the protection signal to the voltage generator VGB. The voltage generator VGB may stop generating the first power source voltage ELVDD (refer to FIG. 4) and/or the second power source voltage ELVSS (refer to FIG. 4) in response to the protection signal.

According to an embodiment, the first connection detection circuit 100 may include a sensing resistor RSS1. The sensing resistor RSS1 may have a predetermined constant resistance value. As an example, the sensing resistor RSS1 may have the resistance value of about 470 ohms (S2). The sensing resistor RSS1 may generate the current I of the detection line DW1 with the connection resistors R1 to R4. The sensing resistor RSS1 may be connected in series with the connection resistors R1 to R4. The second voltage V2 may be determined by the sensing resistor RSS1 and the connection resistors R1 to R4. Accordingly, the sensing resistor RSS1 may determine the difference in voltage between the first node ND11 and the second node ND12. Accordingly, when the sensing resistor RSS1 varies, the voltage difference may be changed, and thus, the detection signal DTS may be changed.

The second connection detection circuit 200 may include a first controller 210, a second controller 220, and a reference voltage generator 230. The second connection detection circuit 200 may include a second detection line DW2. The second detection line DW2 may be connected to the first controller 210 after passing through the connection portion 20 of the second connector CB2. One end of the first controller 210 may be connected to a first node ND21 adjacent to one end of the connection portion 20, and the other end of the first controller 210 may be connected to a second node ND22 adjacent to the other end of the connection portion 20. The second detection line DW2 may include a plurality of second contact portions CP2 passing through the second connector CB2 between the first node ND21 and the second node ND22. Details (e.g., explanation for RSS2, and CP21 to CP24) of the second connection detection circuit 200 that are substantially the same as those of the first connection detection circuit 100 will be omitted.

Table 1 shows an example of detecting the connection status by the connection detection circuit according to an embodiment. Table 1 shows an example of generating the detection signal by the connection detection circuit.

TABLE 1

| RSS1 R1-R4 | 470 Rtotal | V1 Current (I) | 3.3 Voltage difference (V1 − V2) | Vref Detection voltage (VD) | 3.00 ALERT | STATUS |
|---|---|---|---|---|---|---|
| 0 | 470 | 7.02 | 0.00 | 0.00 | High | Normal |
| 4.3 | 474.3 | 6.96 | 29.9 | 2.99 | High | Normal |
| 4.4 | 474.4 | 6.96 | 30.6 | 3.06 | Low | Error |
| 4.5 | 474.5 | 6.95 | 31.3 | 3.13 | Low | Error |

Referring to Table 1, R1-R4 denotes a sum of resistance of the first connection resistor R1, the second connection resistor R2, the third connection resistor R3, and the fourth connection resistor R4. Rtotal denotes values obtained by adding a resistance of the sensing resistor RSS1 to the sum R1-R4 of the resistance of the first to fourth resistors R1 to R4. The voltage difference (unit: millivoltages) denotes a difference between the first voltage V1 and the second voltage V2. ALERT denotes the detection signal. When the ALERT is low, the first detection signal DTS1 may be generated, and when the ALERT is high, the second detection signal DTS2 may be generated. STATUS denotes the connection status. Normal denotes that the connection status is normal, and error denotes that the connection status is abnormal. In the embodiment of Table 1, when the sum of resistances of the first to fourth connection resistors R1 to R4 is about 4.3Ω, the connection status of the connection portion 10 may be in the normal status. That is, when the detection voltage VD (unit: voltage) is smaller than the reference voltage Vref of about 3.00V, the connection status may be in the normal status. In the present embodiment, when the sum of resistances of the first to fourth connection resistors R1 to R4 is about 4.4Ω, the connection status of the connection portion 10 may be in the error status. In this case, the detection voltage VD may be greater than the reference voltage Vref of about 3.00V. In the embodiment of Table 1, the reference voltage Vref is about 3.00V, the first voltage V1 is about 3.3V, and the sensing resistor RSS1 has a resistance of about 470Ω. Table 1 is merely an example. According to an embodiment, the first connection detection circuit 100 may control a level of the reference voltage Vref and a level of the sensing resistor RSS1 such that the sum of the first to fourth connection resistors R1 to R4 in the normal status may be different from the sum of the first to fourth connection resistors R1 to R4 in the error status.

FIG. 7 shows a control circuit board CCB including the connection detection circuits 300 and 400 according to an embodiment of the present disclosure. In FIG. 7, the same reference numerals denote the same elements in FIG. 6, and thus, detailed descriptions of the same elements will be omitted.

In FIG. 7, the connection detection circuits 300 and 400 may include a third connection detection circuit 300 and a fourth connection detection circuit 400. The third connection detection circuit 300 may detect a connection status of a connection portion 10 of a first connector CB1, and the fourth connection detection circuit 400 may detect a connection status of a connection portion 20 of a second connector CB2. Hereinafter, the third connection detection circuit 300 will be described as a representative example. Descriptions about the third connection detection circuit 300 may be applied to the fourth connection detection circuit 400, and thus, descriptions about the fourth connection detection circuit 400 will be omitted. Hereinafter, for the convenience of explanation, the third connection detection circuit 300 will be referred to as a connection detection circuit 300.

The connection detection circuit 300 may include a controller 310 and a reference voltage difference generator 320. The connection detection circuit 300 may include the controller 310 in lieu of the first controller 110 and the second controller 120 of the first connection detection circuit 100 of FIG. 6. The connection detection circuit 300 may include the reference voltage difference generator 320 in lieu of the reference voltage generator 130 of the first connection detection circuit 100 of FIG. 6.

The controller 310 may detect a voltage difference Vdi between a first node ND31 to which a first voltage V1 is applied and a second node ND32 to which a second voltage V2 is applied.

The reference voltage difference generator 320 may generate a reference voltage difference VDF. The reference voltage difference VDF may be generated in plural. As an example, the reference voltage difference VDF may be generated at a level of about mV, about 50 mV, about 70 mV, or about 90 mV. The reference voltage difference VDF may be variably determined by the reference voltage difference generator 320. The connection detection circuit 300 may change the reference voltage difference VDF, and thus, may change the detected connection resistance.

A sensing resistor RSS3 may be connected to the second node ND32. The sensing resistor RSS3 may be variably determined. The detected connection resistance may be dependent on a size of the sensing resistor RSS3. The size of the sensing resistor RSS3 may be about 470Ω.

The reference voltage difference generator 320 may provide the reference voltage difference VDF to the controller 310.

The controller 310 may compare the voltage difference Vdi with the reference voltage difference VDF to generate a detection signal DTS and may provide the detection signal DTS to the controller MCU. When the voltage difference Vdi is greater than the reference voltage difference VDF, the controller 310 may generate a first detection signal DTS1, and when the voltage difference Vdi is smaller than the reference voltage difference VDF, the controller 310 may generate a second detection signal DTS2.

The controller MCU may determine that the connection status is in the error status when receiving the first detection signal DTS1, and the controller MCU may determine that the connection status is in the normal status when receiving the second detection signal DTS2. When the connection status is determined as the error status, the controller MCU may apply a signal to the voltage generator VGB to stop the voltage generation.

The connection detection circuit 300 may compare the voltage difference Vdi with the reference voltage difference VDF and may detect resistances of connection resistors R1 to R4 of contact portions CP1 included in the connection portion 10.

As an example, in a case where the reference voltage difference VDF is about 30 mV and the sensing resistor RSS3 has a resistance of about 470Ω, the connection detection circuit 300 may determine that a sum of the resistances of the connection resistors R1 to R4 of the contact portions CP1 is about 4.3Ω when the connection status is in the normal status and the voltage difference Vdi detected by the controller is about 30 mV. That is, when the reference voltage difference VDF is equal to the detected voltage difference Vdi, the connection detection circuit 300 may determine that the sum of the resistances of the connection resistor is about 4.3, and the connection status may be detected as normal.

However, in the case where the reference voltage difference VDF is about mV and the sensing resistor RSS3 has a resistance of about 470Ω, the sum of the resistances of the connection resistors R1 to R4 may be greater than about 4.3 when the voltage difference Vdi detected by the connection detection circuit 300 is greater than about mV. In this case, the connection detection circuit 300 may generate the first detection signal DTS1, and the connection status may be determined to the error status.

Table 2 below shows an example of detecting the connection status by the connection detection circuit according to an embodiment. In Table 2, the reference voltage difference VDF is set to about 30 mV, about 50 mV, and about 70 mV.

TABLE 2

| VDF | RSS3<br>R1-R4 | 470<br>Rtotal | Vdi |
|---|---|---|---|
| 0 | 0 | 470 | 0 |
| 30.0 | 4.31 | 474.3 | 30.0 |
| 30.0 | 5.04 | 475.0 | 35.0 |
| 30.0 | 5.77 | 475.8 | 40.0 |
| 30.0 | 6.50 | 476.5 | 45.0 |
| 50.0 | 7.23 | 477.2 | 50.0 |
| 50.0 | 7.97 | 478.0 | 55.0 |
| 50.0 | 8.70 | 478.7 | 60.0 |
| 50.0 | 9.44 | 479.4 | 65.0 |
| 70.0 | 10.19 | 480.2 | 70.0 |
| 70.0 | 10.93 | 480.9 | 75.0 |
| 70.0 | 11.68 | 481.7 | 80.0 |
| 70.0 | 12.43 | 482.4 | 85.0 |

Referring to Table 2, when the sensing resistor RSS3 has the resistance of about 470Ω and the reference voltage difference VDF is about 30 mV, the sum R1-R4 of the resistances of the first to fourth connection resistors R1 to R4 may be about 4.31Ω in a case where the voltage difference Vdi is equal to or smaller than about 30 mV. That is, when the sum R1-R4 of the resistances of the first to fourth connection resistors R1 to R4 is about 4.31Ω, the connection status of the connection portion 10 may be determined as the normal status. When the reference voltage difference VDF is set to about 70 mV and the detected voltage difference Vdi is equal to or smaller than about 70 mV, the sum R1-R4 of the resistances of the first to fourth connection resistors R1 to R4 may be determined to about 10.19Ω. In this case, the connection status may be determined as the normal status. When the reference voltage difference VDF is about 30 mV and the detected voltage difference Vdi is about 35 mV, about 40 mV, or about 45 mV that is greater than about 30 mV, the sum R1-R4 of the resistances of the first to fourth connection resistors R1 to R4 may be about 5.04Ω, 5.77Ω, or 6.50Ω that is greater than about 4.31Ω. In this case, the connection status may be determined as the error status.

Figure 8:
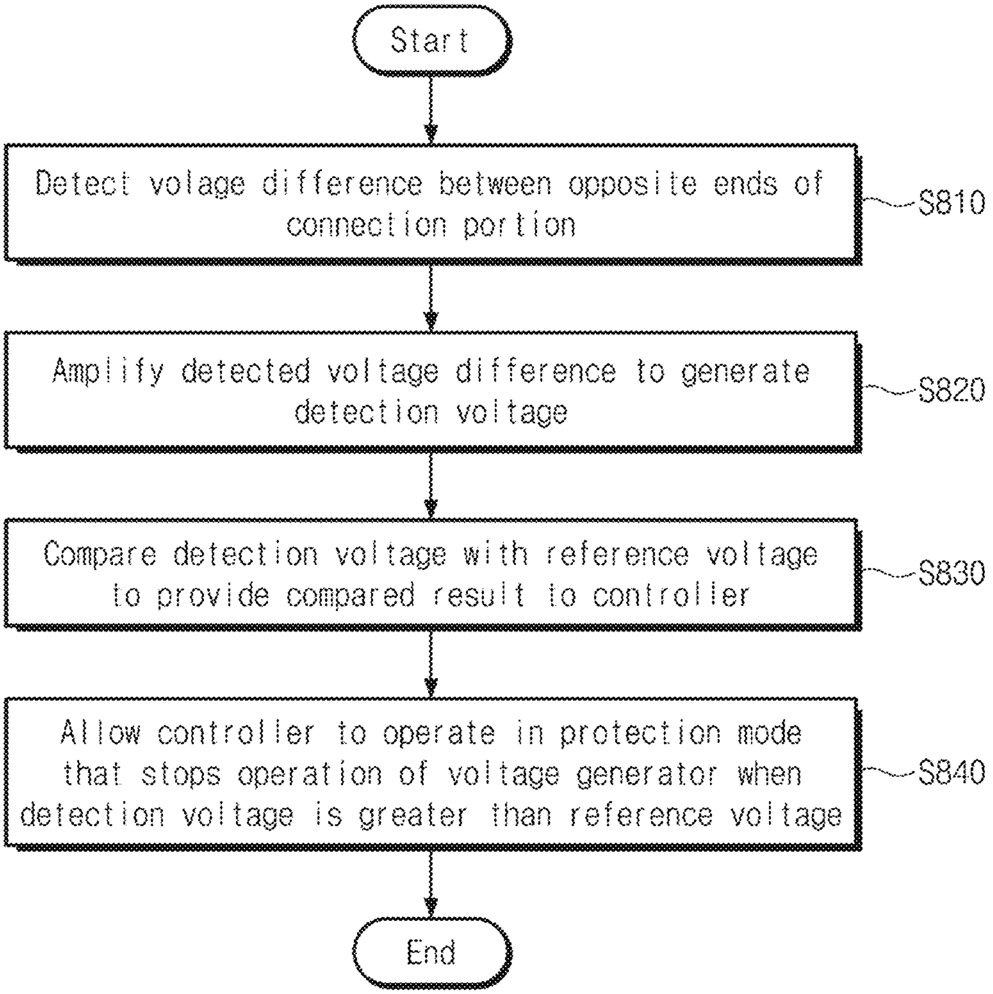
FIGS. 8 and 9 are flowcharts of a connection detecting method of the display device according to embodiments of the present disclosure.
Figure 9:
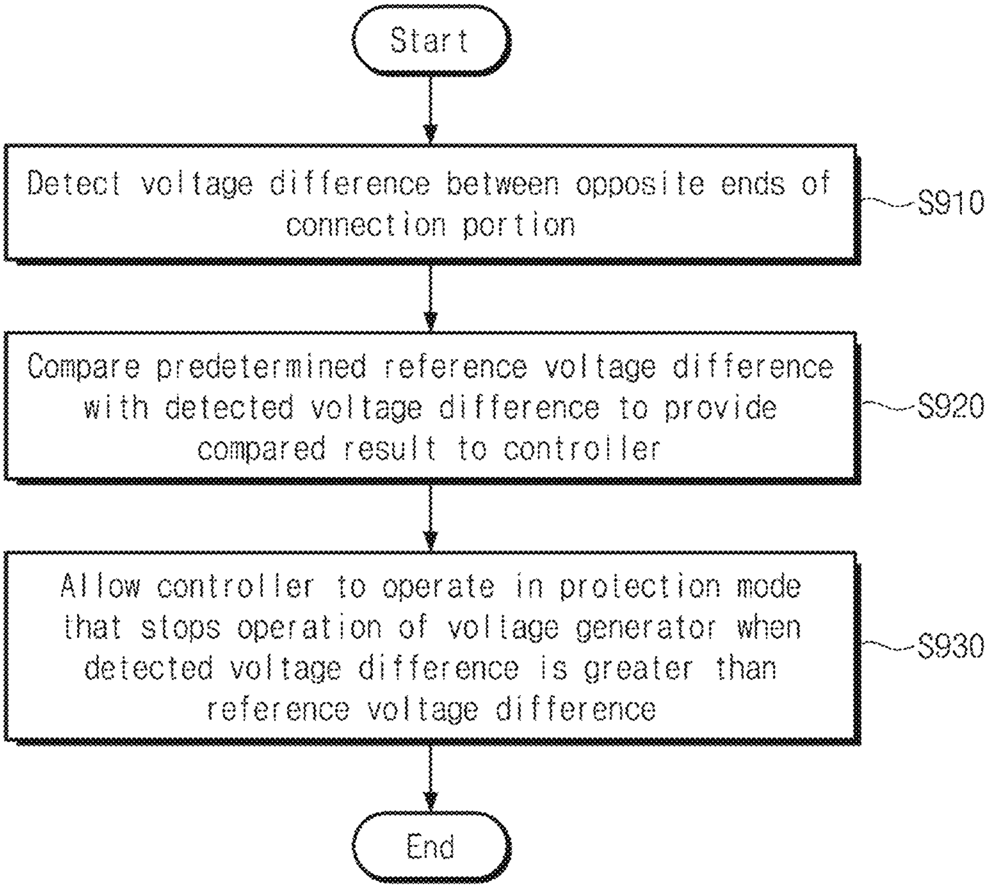

FIGS. 8 and 9 are flowcharts of a connection detecting method of the display device according to embodiments of the present disclosure. FIG. 8 shows the connection detecting method of the connection detection circuit according to the embodiment of FIG. 6. FIG. 9 shows the connection detecting method of the connection detection circuit according to the embodiment of FIG. 7.

The detecting method shown in FIG. 8 will be described together with reference to FIG. 6. Referring to FIG. 8, the first connection detection circuit 100 may detect the voltage difference between opposite ends of the connection portion 10 (S810). The first controller 110 may detect the voltage difference between the first node ND11 and the second node ND12, which are connected to opposite ends of the contact portions CP1 of the connection portion 10, respectively.

The first connection detection circuit 100 may amplify the voltage difference detected by the first controller 110 and may generate the amplified detection voltage VD (S820). The first controller 110 may include the amplifier.

The first connection detection circuit 100 may compare the detection voltage VD with the reference voltage Vref using the second controller 120 and may provide the compared result, e.g., the detection signal, to the controller MCU (S830). The second controller 120 may include the comparator.

When the detection voltage VD is greater than the reference voltage Vref, the controller MCU may be operated in the protection mode that provides the signal to the voltage generator VGB to stop generating the voltage (S840).

The detecting method shown in FIG. 9 will be described together with reference to FIG. 7. Referring to FIG. 9, the third connection detection circuit 300 (hereinafter, referred to as a connection detection circuit) may detect the voltage difference Vdi between opposite ends of the connection portion 10 (S910). The controller 310 may detect the voltage difference Vdi between the first voltage V1 and the second voltage V2, which are applied to opposite ends of the contact portions CP1, respectively.

The connection detection circuit 300 may receive the reference voltage difference VDF from the reference voltage difference generator 320 via the controller 310, may compare the detected voltage difference Vdi with the reference voltage difference VDF, and may provide the compared result, e.g., the detection signal DTS, to the controller MCU (S920).

As a result of determining based on the received detection signal DTS, the controller MCU may be operated in the protection mode that provides the signal to stop the voltage generation to voltage generator VGB when the voltage difference Vdi is greater than the reference voltage difference VDF.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. A display device comprising:

a display panel comprising a plurality of pixels, which displays an image;

a first circuit board connected to the display panel and which provides a first signal to the display panel;

a second circuit board, which provides a second signal to the first circuit board; and a connection board, which electrically connects the first circuit board to the second circuit board and comprises a connection portion connected to the first circuit board and the second circuit board, wherein the second circuit board comprises a connection detection circuit, which detects a connection status of the connection portion and generates a detection signal, wherein the second circuit board further comprises a voltage generator, wherein the connection detection circuit comprises a detection line connected to the voltage generator, a first node and a second node, and passing through the connection portion between the first and second nodes, and the connection portion comprises a plurality of contact portions through which the detection line passes.

2. The display device of claim 1, wherein the second circuit board generates the second signal based on an image signal applied thereto from an outside, and the first circuit board generates the first signal based on the second signal and provides the first signal to the display panel.

3. The display device of claim 1, wherein the voltage generator, generates a plurality of voltages for an operation of the display panel, and the plurality of voltages comprise a first power source voltage, a second power source voltage, and a first voltage applied to the connection detection circuit and the connection portion for a connection detection.

4. The display device of claim 3, wherein the second circuit board further comprises a controller, and the controller receives the detection signal and determines the connection status of the connection portion as a normal status or an error status based on the detection signal applied thereto.

5. The display device of claim 4, wherein the controller applies a protection signal to the voltage generator to stop the generation of the voltages when the connection status is determined as the error status.

6. The display device of claim 4, wherein the connection detection circuit compares a predetermined reference voltage with a detection voltage detected according to a difference between the first voltage applied to a first end of the connection portion and a second voltage of a second end of the connection portion, generates a first detection signal when the detection voltage is higher than the reference voltage, and generates a second detection signal when the detection voltage is lower than the reference voltage, and the second end of the connection portion is opposite to the first end.

7. The display device of claim 1, wherein the connection detection circuit further comprises a first controller, whose opposite ends are connected to the first node and the second node, respectively, wherein the first voltage is applied to the first node, the second voltage is applied to the second node, and the contact portions are disposed between the first node and the second node.

8. The display device of claim 7, wherein the first controller calculates a voltage difference between the first voltage and the second voltage, which are changed depending on a plurality of connection resistors of the contact portions, and amplifies the calculated voltage difference to generate a detection voltage.

9. The display device of claim 8, wherein the connection detection circuit further comprises a second controller, which compares the detection voltage with a predetermined reference voltage, generates a first detection signal when the detection voltage is higher than the predetermined reference voltage, and generates a second detection signal when the detection voltage is lower than the predetermined reference voltage.

10. The display device of claim 9, wherein the connection detection circuit further comprises a sensing resistor, and the sensing resistor is connected to the second node.

11. The display device of claim 1, wherein the connection portion comprises a first power source voltage line and a second power source voltage line, which are disposed in first areas defined at opposite ends of the connection portion, respectively, the first power source voltage is applied to the first power source voltage line, the second power source voltage is applied to the second power source voltage line, and the contact portions are disposed in a second area defined between the first areas to be adjacent to the first areas.

12. The display device of claim 4, wherein the connection detection circuit comprises a first controller, which detects a voltage difference between a first node to which the first voltage is applied and a second node to which a second voltage is applied, compares the detected voltage difference with a reference voltage difference, generates a first detection signal when the voltage difference is greater than the reference voltage difference, and generates a second detection signal when the voltage difference is smaller than the reference voltage difference, and the second voltage is different from the first voltage according to connection resistors of the connection portion.

13. The display device of claim 12, wherein the reference voltage difference is variably determined, and when the reference voltage difference is changed, sizes of the connection resistors are variably determined depending on the changed reference voltage difference.

14. A display device comprising:

a display panel comprising a plurality of pixels, which displays an image;

a first circuit board electrically connected to the display panel;

a second circuit board electrically connected to the display panel;

a connection board comprising a connection portion connecting the first circuit board to the second circuit board;

a connection detection circuit disposed on the second circuit board, and which detects a connection status of the connection portion, and generates a detection signal;

a voltage generator, which generates a power source voltage applied to the display panel and a first voltage applied to the connection detection circuit; and a controller connected to the connection detection circuit and which determines the connection status based on the detection signal applied thereto, wherein the connection detection circuit comprises a first controller, which detects a voltage difference between a first end of the connection portion to which the first voltage is applied and a second end of the connection portion to which the second voltage is applied, wherein the second voltage is determined from the first voltage depending on a voltage drop due to a plurality of connection resistors of the connection portion.

15. The display device of claim 14, further comprising a second controller, which compares a detection voltage obtained by amplifying the voltage difference from the first controller with a predetermined reference voltage, generates a first detection signal when the detection voltage is greater than the reference voltage, and generates a second detection signal when the detection voltage is smaller than the reference voltage.

16. The display device of claim 14, wherein the first controller compares the voltage difference with a predetermined reference voltage difference, generates a first detection signal when the voltage difference is greater than the reference voltage difference, and generates a second detection signal when the voltage difference is smaller than the reference voltage difference, and the controller determines that the connection status is an error status when receiving the first detection signal and determines that the connection status is a normal status when receiving the second detection signal.

17. The display device of claim 14, wherein the first circuit board is provided in plural, the connection board is provided in plural, the connection detection circuit is provided in plural, the plurality of connection boards connect the first circuit boards and the second circuit board, respectively, and each of the plurality of connection detection circuits detects the connection status of each of the connection boards.

18. The display device of claim 14, wherein the connection resistors are connected to each other in series.

19. A display device comprising:

a display panel comprising a plurality of pixels, which displays an image;

a first circuit board connected to the display panel and which provides a first signal to the display panel;

a second circuit board, which provides a second signal to the first circuit board; and a connection board, which electrically connects the first circuit board to the second circuit board and comprises a connection portion connected to the first circuit board and the second circuit board, wherein the second circuit board comprises:

a connection detection circuit, which detects a connection status of the connection portion and generates a detection signal;

a voltage generator, which generates a plurality of voltages for an operation of the display panel; and a controller, which receives the detection signal and determines the connection status of the connection portion as a normal status or an error status based on the detection signal applied thereto, wherein the controller applies a protection signal to the voltage generator to stop the generation of the voltages when the connection status is determined as the error status.

* * * * *